United States Patent
Kishi

(10) Patent No.: US 9,241,120 B2
(45) Date of Patent: Jan. 19, 2016

(54) IMAGE SENSING DEVICE AND IMAGE CAPTURING APPARATUS

(71) Applicant: CANON KABUSHIKI KAISHA, Tokyo (JP)

(72) Inventor: Takafumi Kishi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/359,285

(22) PCT Filed: Oct. 24, 2012

(86) PCT No.: PCT/JP2012/078081
§ 371 (c)(1),
(2) Date: May 19, 2014

(87) PCT Pub. No.: WO2013/077154
PCT Pub. Date: May 30, 2013

(65) Prior Publication Data
US 2014/0267865 A1 Sep. 18, 2014

(30) Foreign Application Priority Data
Nov. 21, 2011 (JP) .................................. 2011-254457

(51) Int. Cl.
*H04N 5/378* (2011.01)
*G03B 13/36* (2006.01)
*H04N 5/369* (2011.01)
*H04N 5/232* (2006.01)

(52) U.S. Cl.
CPC ............... *H04N 5/378* (2013.01); *G03B 13/36* (2013.01); *H04N 5/23212* (2013.01); *H04N 5/369* (2013.01)

(58) Field of Classification Search
CPC ..... H04N 5/378; H04N 5/3696; H04N 5/374; H04N 5/3745
See application file for complete search history.

(56) References Cited

U.S. PATENT DOCUMENTS

| | | | |
|---|---|---|---|
| 6,933,978 B1 * | 8/2005 | Suda | 348/345 |
| 7,812,299 B2 * | 10/2010 | Kusaka | 250/208.1 |
| 9,001,262 B2 * | 4/2015 | Onuki et al. | 348/352 |
| 2012/0044406 A1 * | 2/2012 | Shimoda et al. | 348/345 |
| 2014/0218592 A1 * | 8/2014 | Fujii | 348/345 |

FOREIGN PATENT DOCUMENTS

| | | |
|---|---|---|
| JP | 2001-083407 A | 3/2001 |
| JP | 2003-007994 A | 1/2003 |
| JP | 2009-047734 A | 3/2009 |
| JP | 2009-047735 A | 3/2009 |

* cited by examiner

*Primary Examiner* — James Hannett
(74) *Attorney, Agent, or Firm* — Canon USA, Inc. IP Division

(57) ABSTRACT

An image sensing device comprises pixels having micro lenses; a plurality of photoelectric conversion regions arranged in the pixels; and a first adding unit which adds together signals from the plurality of photoelectric conversion regions arranged in the same pixel; wherein the pixels are arranged in a row direction and a column direction, mixed among the pixels are an additional reading region in which addition is performed by the first adding unit and an individual reading region in which addition is not performed by the first adding unit, and a signal is read from at least one photoelectric conversion region, and the number of pixels in a horizontal direction in the individual reading region is constant in the row direction.

9 Claims, 14 Drawing Sheets

F I G. 5A
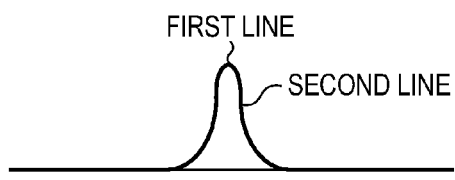
F I G. 5B
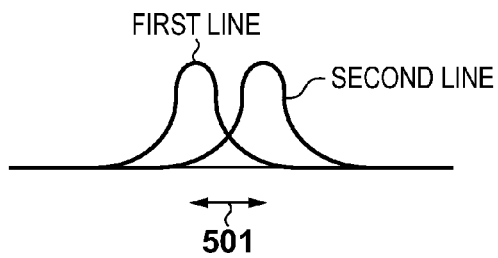

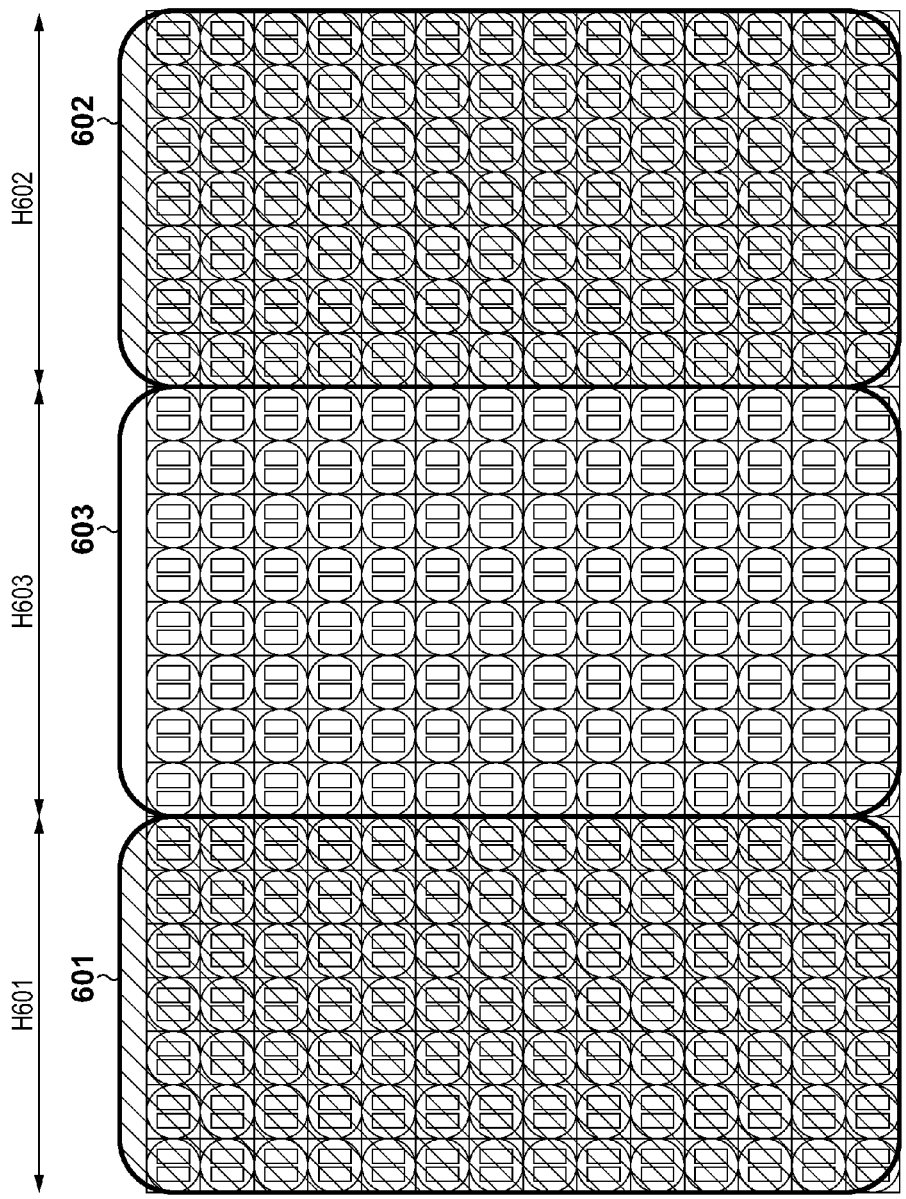

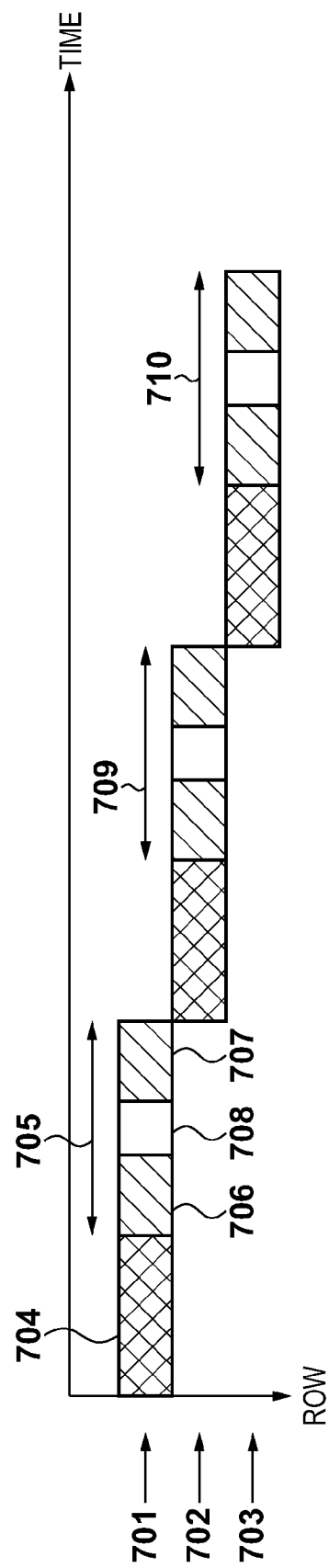

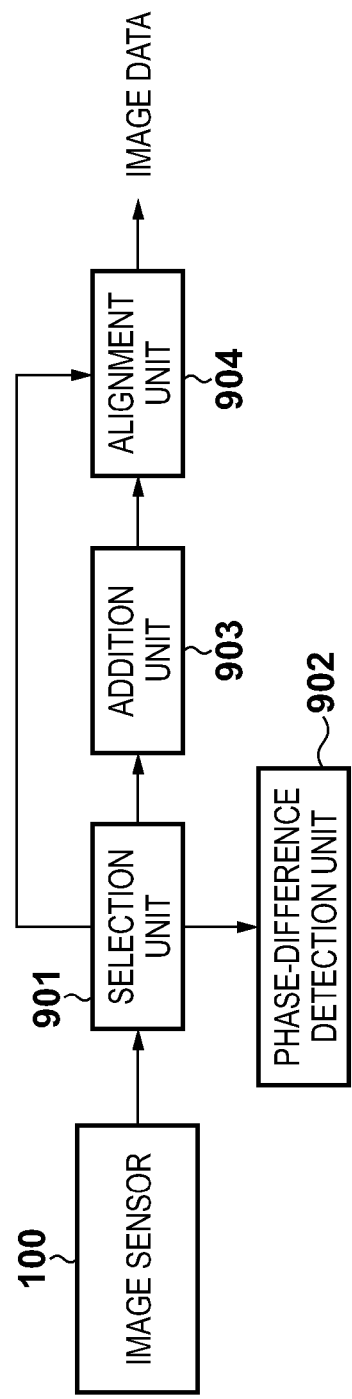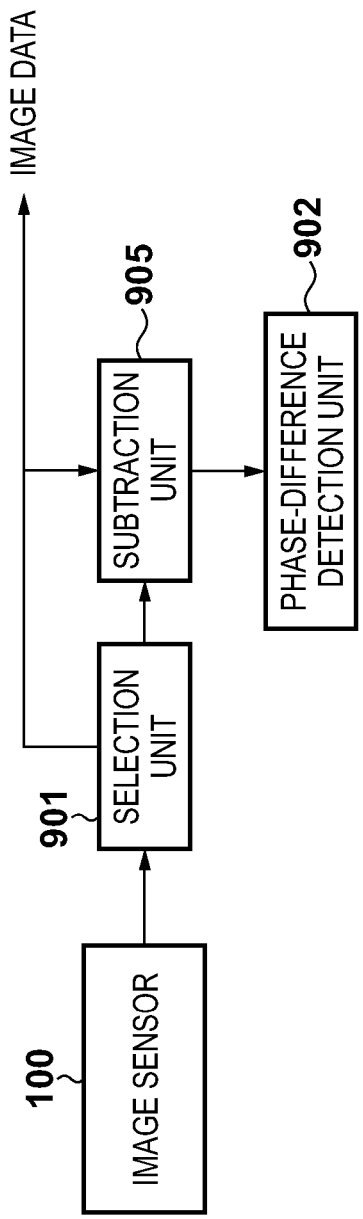

→ TIME
F I G. 10A
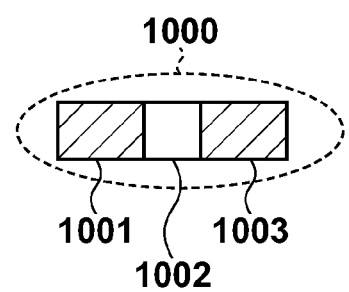
F I G. 10B
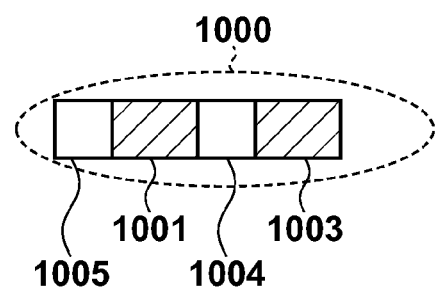
F I G. 10C
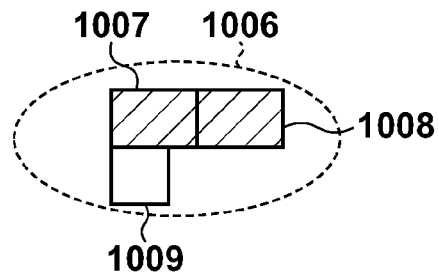

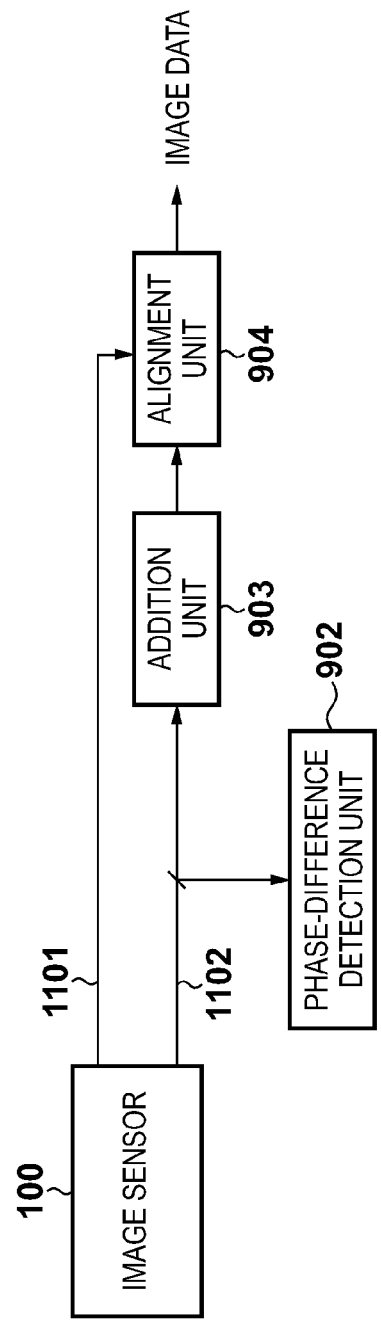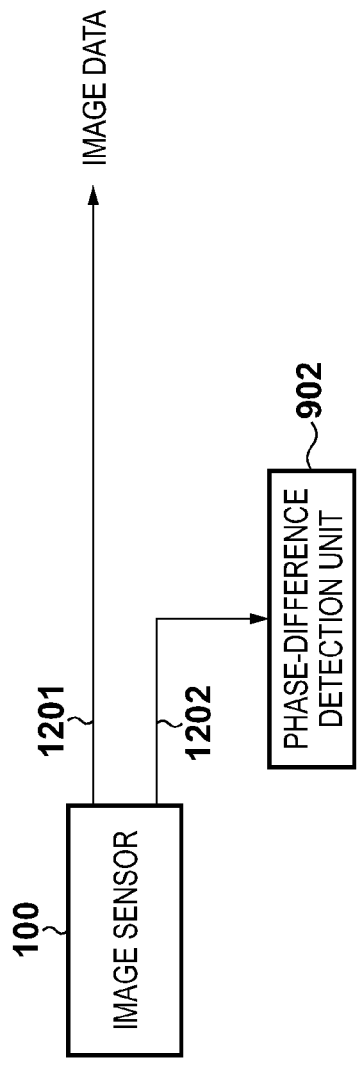

F I G. 14
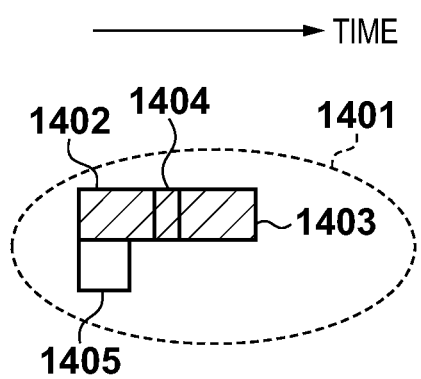

IMAGE SENSING DEVICE AND IMAGE CAPTURING APPARATUS

TECHNICAL FIELD

The present invention relates to an image sensing device that performs photoelectric conversion of an optical image of an object.

BACKGROUND ART

There has conventionally existed a technology in solid-state image sensing device whereby phase-difference focus detection is performed by dividing a photodiode on which light is concentrated by one micro lens that is in a single pixel. In Japanese Patent Laid-Open No. 2001-083407, the photodiode in one pixel is divided into two, allowing the photodiodes to receive light from different pupil faces of an image capturing lens. Focus detection is performed with the image capturing lens by comparing the output from the two photodiodes. An approach also exists whereby the output from such a solid state image sensing device is used not only for focus detection, but also as an image signal.

In Japanese Patent Laid-Open No. 2001-083407 mentioned above, focus detection is performed by reading signals of two photodiodes separately from the image sensing device and calculating a phase difference. Furthermore, when the signals from the photodiodes are added together, they can be used as an image signal. The more data there is, the more accurately focus detection can be performed, and therefore it is preferable to read signals from photodiodes in all pixels in an image sensing device individually and detect phase differences, after which the signals of all the photodiodes are added together to produce an image signal. However, it takes time to read the signals from the photodiodes in all the pixels individually. For example, if two photodiodes are provided in the horizontal direction in an image sensing device that has 4000 pixels in the horizontal direction, there are 8000 photodiodes in the horizontal direction, which results in a dramatically longer reading time than in an ordinary image sensing device in which the photodiodes are not divided.

SUMMARY OF INVENTION

The present invention has been made in consideration of the aforementioned problems, and realizes an image sensing device in which signals from the image sensing device are read at high speed and the output of the image sensing device can be used not only for focus detection but as an image signal as well.

In order to solve the aforementioned problems, the present invention provides an image sensing device comprising: pixels having micro lenses; a plurality of photoelectric conversion regions arranged in the pixels; and first adding means for adding together signals from the plurality of photoelectric conversion regions arranged in the same pixel; wherein the pixels are arranged in a row direction and a column direction, mixed among the pixels are an additional reading region in which addition is performed by the first adding means and an individual reading region in which addition is not performed by the first adding means, and a signal is read from at least one photoelectric conversion region, and the number of pixels in a horizontal direction in the individual reading region is constant in the row direction.

In order to solve the aforementioned problems, the present invention provides an image sensing device comprising: pixels having micro lenses; a plurality of photoelectric conversion regions arranged in the pixels; and adding means for adding together signals from the plurality of photoelectric conversion regions arranged in the same pixel; wherein the pixels are arranged in a row direction and a column direction, further comprising: first outputting means for outputting a signal in which signals from the photoelectric conversion regions were added together by the adding means; and second outputting means for outputting signals from the photoelectric conversion regions that have not been added together by the adding means, wherein among the plurality of pixels, an individual/additional reading region is provided from which signals from the first outputting means and the second outputting means are output.

In order to solve the aforementioned problems, the present invention provides an image capturing apparatus comprising: a photographic lens; and the image sensing device mentioned above that receives luminous flux through the photographic lens.

According to the present invention, signals from the image sensing device are read at high speed and the output from the image sensing device can be used not only for focus detection but as an image signal as well.

Further features of the present invention will become apparent from the following description of exemplary embodiments (with reference to the attached drawings).

BRIEF DESCRIPTION OF DRAWINGS

FIGS. 5A and 5B are views for describing phase-difference focus detection.

FIG. 6 is a schematic view showing additional reading regions and individual reading regions in a first embodiment.

FIG. 7 is a schematic view showing a signal reading operation in the present embodiment.

FIGS. 9A and 9B are schematic views showing a configuration of an image capturing apparatus of the first embodiment.

FIGS. 10A-10C are schematic views showing a signal output by an image sensing device of the first embodiment.

FIG. 11 is a schematic view showing a configuration of an image capturing apparatus of the first embodiment.

FIG. 12 is a schematic view showing a configuration of an image capturing apparatus of a second embodiment.

FIG. 14 is a schematic view showing a signal output by an image sensing device of the second embodiment.

DESCRIPTION OF EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

Sensor Configuration

A configuration of an image sensing device according to an embodiment of the present invention is described below, with reference to FIG. 1.

Figure 1:
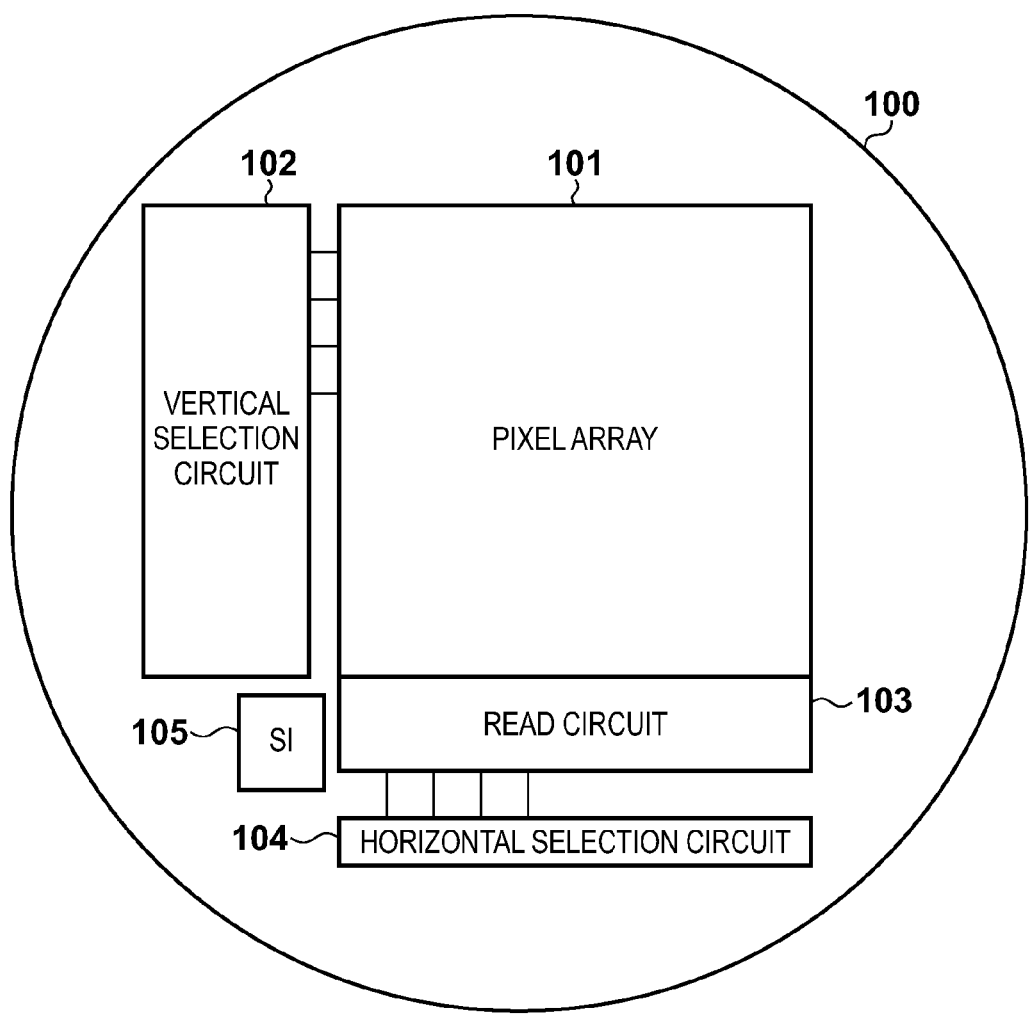
FIG. 1 is a schematic view showing a configuration of an image sensing device of an embodiment according to the present invention.

In FIG. 1, an image sensing device (hereinafter, an image sensor) 100 includes a pixel array 101, a vertical selection circuit 102 that selects a row in the pixel array 101, and a horizontal selection circuit 104 that selects a column in the pixel array 101. The image sensor 100 further includes a read circuit 103 that reads signals from pixels selected by the vertical selection circuit 102 among the pixels in the pixel array 101 and a serial interface (SI) 105 for the external determination of an operational mode and the like of the circuits. The read circuit 103 has a memory that stores signals, a gain amplifier, an A/D converter, and so on for each column. Note that besides the constituent elements shown in the drawing, the image sensor 100 is also provided with, for example, a control circuit and a timing signal generation circuit that provides timing signals to the vertical selection circuit 102, the horizontal selection circuit 104, the read circuit 103, and so on.

The vertical selection circuit 102 sequentially selects each of the rows in the pixel array 101 and reads these to the read circuit 103. For every column, the horizontal selection circuit 104 sequentially selects pixel signals that have been read to the read circuit 103.

Figure 2:
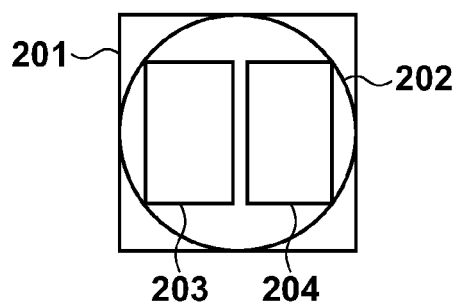
FIG. 2 is a schematic view showing a configuration of one pixel of an image sensing device of the present embodiment.

FIG. 2 schematically shows a configuration of one pixel in the image sensor 100. Here, 201 represents a pixel. Each pixel has a micro lens 202. Each pixel also has photodiodes (hereafter "PD") as a plurality of photoelectric conversion regions. In the drawing, there is a PD 203 on the left and a PD 204 on the right, but there may be two or more, with no limit on the number; for example, there may be 4 or 9, etc. Note that besides the constituent elements shown in the drawing, the pixel is provided with, for example, a pixel amplifier for reading a signal from the PD to the column read circuit 103, a selection switch for selecting a row, a reset switch for resetting the signal from the PD, and so on.

Figure 3:
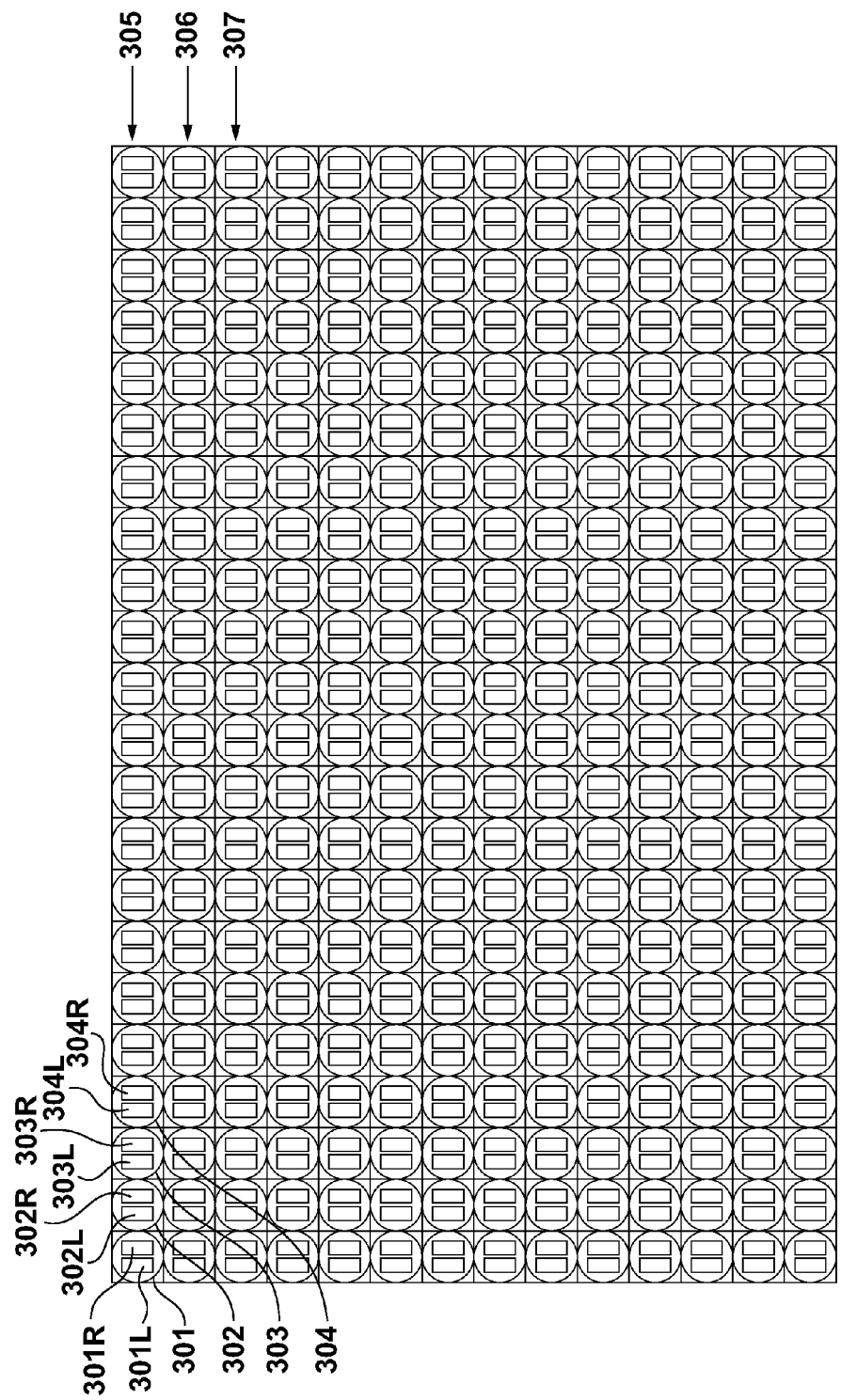
FIG. 3 is a schematic view showing a pixel array in an image sensing device of the present embodiment.

FIG. 3 shows a pixel array 101. The pixel array 101 is constituted by arranging a plurality of the pixels shown in FIG. 2 in a two-dimensional arrangement, in a row direction (horizontal direction) and a column direction (vertical direction), in order to provide a two-dimensional image signal. In FIGS. 3, 301, 302, 303, and 304 are pixels; 301L, 302L, 303L, and 304L correspond to the PD 203 shown in FIG. 2; and 301R, 302R, 303R, and 304R correspond to the PD 204 shown in FIG. 2.

Figure 4:
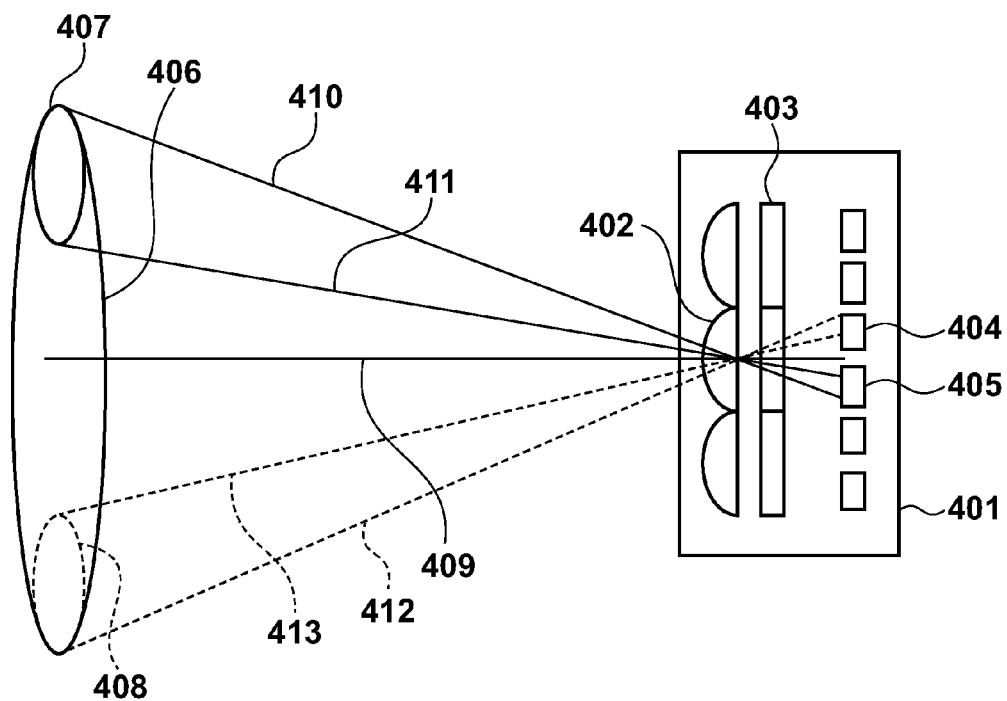
FIG. 4 is a view that schematically shows a relationship of image formation of an object.

An image-forming relationship between an object and the image sensor 100 having the pixel array shown in FIG. 3 is described below, with reference to FIG. 4. FIG. 4 conceptually shows luminous flux exiting an exit pupil in a photographic lens and entering the image sensor 100.

In FIG. 4, 401 is a cross-section of a pixel array, 402 is a micro lens, 403 is a color filter, and 404 and 405 are photodiodes. The PD 404 and the PD 405 correspond to the PD 203 and the PD 204 shown in FIG. 2. Also, 406 indicates the exit pupil in the photographic lens.

The center of the luminous flux exiting the exit pupil towards the pixel that has the micro lens 402 is an optical axis 409. The light exiting the exit pupil enters the image sensor 100 centered about the optical axis 409. Also, 407 and 408 indicate partial regions of the exit pupil of the photographic lens. Outermost light rays of the light passing through the partial region 407 of the exit pupil are indicated by 410 and 411, and outermost light rays of the light passing through the partial region 408 of the exit pupil are indicated by 412 and 413. As can be seen from FIG. 4, out of the luminous flux exiting the exit pupil, the luminous flux above the optical axis 409 enters the PD 405 and the luminous flux below the optical axis 409 enters the PD 404, the optical axis 409 being a boundary therebetween. In other words, the PD 404 and the PD 405 receive light from different regions of the exit pupil of the photographic lens.

Phase difference detection is performed by taking advantage of this characteristic. A phase difference detection method is already known, but it is described briefly below. Assuming that, in a pixel array, data obtained from PDs on the left is a first line and data obtained from PDs on the right is a second line, the phase difference can be detected by calculating the correlation data between the lines. In the pixel array shown in FIG. 3, output from the PDs 301L to 304L and so on, i.e., the PDs located on the left in row 305, is the first line, and output from the PDs 301R to 304R and so on, i.e., the PDs located on the right in row 305, is the second line. Data that is added together in the row direction may be used as the first line and the second line.

FIGS. 5A and 5B show line data when an image is formed from a point light source; the horizontal axis shows the pixel position and the vertical axis shows the output. FIG. 5A shows data of the first line and the second line in an in-focus state, the first line and the second line overlapping in the case of the in-focus state. On the other hand, FIG. 5B shows data of the first line and the second line in an out-of-focus state. In the out-of-focus state, there is a phase difference between the first line and the second line and the pixel positions are misaligned. This misalignment 501 can be calculated to find the degree of misalignment from an in-focus state. By detecting the phase difference in this manner, an in-focus state can be realized by driving the photographic lens.

Generation of an image signal according to the present embodiment is described next. As described above, an in-focus state can be detected by reading the signals from the PD 203 and the PD 204 individually from the image sensor 100 and computing the phase difference. An image signal is generated by adding together the signals of the PDs that have been read individually.

With the image sensor 100 of the present embodiment, the pixels in some partial regions are read individually, and additional reading is performed in other partial regions.

FIG. 6 shows a region in the pixel array which is read individually and regions in which additional reading is performed.

In FIGS. 6, 601 and 602 are additional reading regions in which the signals from the PDs in the pixels are added together and read, and 603 is an individual reading region in which the signals from the PDs in the pixels are read individually. This is discussed in detail below, but the pixel signals from the additional reading regions 601 and 602 are used for the image signal without being used for phase difference detection, while the pixel signals from the individual reading region 603 are added together after detecting the phase difference and then used for the image signal. The number of pixels in the horizontal direction in the regions 601, 602, and 603 is indicated by H601, H602, and H603, respectively.

FIG. 7 schematically shows reading of a signal from the image sensor of the present embodiment. In FIG. 7, the vertical axis shows reading and the horizontal axis shows time.

Also, 701 indicates an operation of reading the row 305 shown in FIG. 3; similarly, 702 and 703 indicate an operation of reading the row 306 and the row 307. When reading the row 305, the vertical selection circuit 102 selects the row 305.

During a vertical reading period 704, the read circuit 103 reads the signal from the pixels in the selected row 305 one column at a time. During a horizontal reading period 705, the signals from the pixels in row 305 held by the read circuit 103 are output from the image sensor 100. Within the horizontal reading period 705, 706 and 707 are the periods during which added PD signals are output from the image sensor 100, and 708 is the period during which the signals of the individual PDs which have not been added together are output from the image sensor 100. In other words, 706, 707, and 708 are the periods during which the signals from the PDs in the pixels in the regions 601, 602, and 603 are output from the image sensor 100.

By reading the signals from the PDs in the pixels in one partial region of the pixel array individually, and adding together and reading the signals from the PDs of the pixels in another partial region in this manner, the horizontal reading period 705 can be made shorter. To make the horizontal reading period 705 even shorter, it is also possible to perform signal addition and an averaging process on signals from nearby pixels in the additional reading region and the individual reading region.

Incidentally, signal addition (first adding means) in the additional reading region may be performed by the pixels or by the read circuit 103. When done by the read circuit 103, it is possible for the addition to be done using an analog signal or for the addition to be done using a digital signal.

In the present embodiment, the number of pixels in the horizontal direction in the additional reading regions and the individual reading region are the same in all rows in order to make the horizontal-direction reading period constant. In other words, the time is the same for the horizontal reading periods 705, 709, and 710 in FIG. 7. This way, reading can be performed simply, without changing a control signal for horizontal reading for each row. If the control signal for horizontal reading for each row were changed, the time taken for horizontal reading for each row would vary, complicating not only control of the image sensor but also the signal output process in the image sensor.

If the number of pixels in the horizontal direction in the additional reading regions and the individual reading region is the same for all rows, the additional reading regions and the individual reading region in the pixel array need not always be the same regions. The reason for this is described below with reference to FIGS. 8A-8D.

Figure 8A:
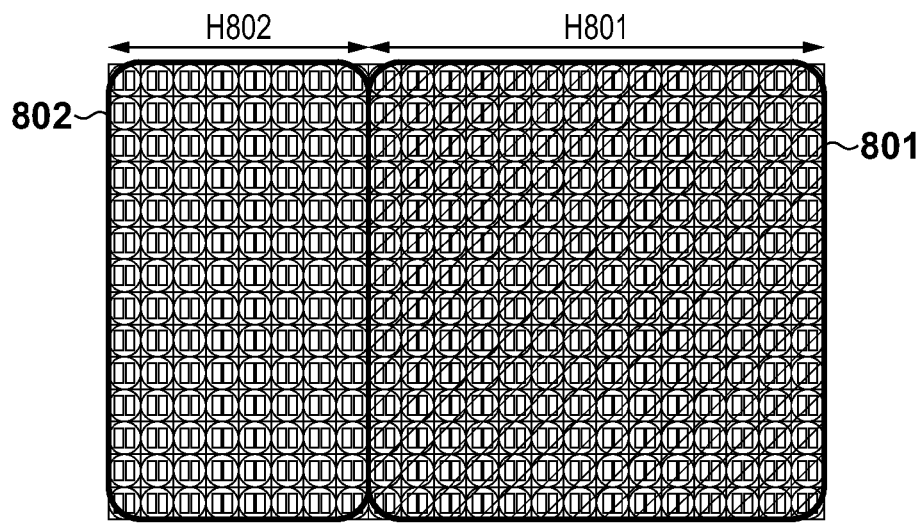
FIGS. 8A-8D are schematic views showing additional reading regions and individual reading regions in the first embodiment.
Figure 8B:
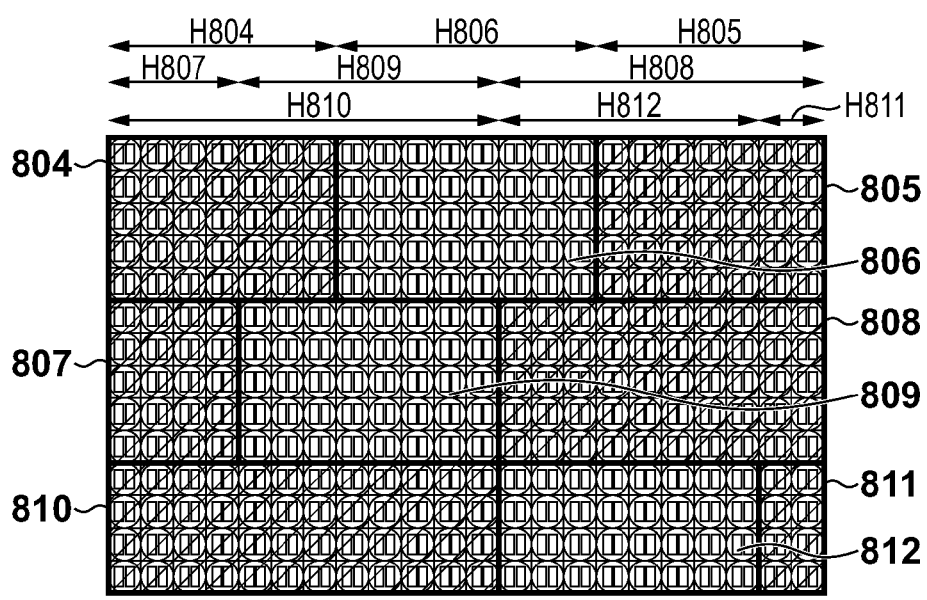

FIGS. 8A and 8B show examples of regions in which individual reading is performed and regions in which additional reading is performed in a pixel array, where FIG. 8A is a case in which the individual reading region is set on the left. Here, 801 is an additional reading region and 802 is an individual reading region. H801 and H802 are the number of pixels in the horizontal direction in the regions 801 and 802. The arrangement of reading regions in FIG. 6 differs from the arrangement of reading regions in FIG. 8A. By shifting the additional reading region and the individual reading region in each frame, the individual reading region needs only be moved to match a direction of movement of an object of focus detection when that object moves. When shifting the additional reading region and the individual reading region for each frame, the time required to read one frame is constant as long as the number of pixels in the horizontal direction in the additional reading region 801 is the same as the total number of pixels in the horizontal direction in the additional reading regions 601 and 602. In other words, the value of H601 and H602 added together equals the value of H801. Furthermore, H802 and H603 have the same value.

Moreover, if the amount of time required to read a single frame is different, then the number of pixels in the horizontal direction in each frame may be different.

FIG. 8B shows an example of additional reading regions and individual reading regions shifted within a single frame. In this drawing, 804, 805, 807, 808, 810, and 811 are additional reading regions, and H804, H805, H807, H808, H810, and H811 are the numbers of pixels in the horizontal direction therein. Also, 806, 809, and 812 are individual reading regions and H806, H809, and H812 are the numbers of pixels in the horizontal direction therein. In this case, to make the amounts of time required to perform horizontal-direction reading constant, H806, H809, and H812 are the same value. Moreover, the total of H804 and H805, the total of H807 and H808, and the total of H810 and H811 are the same value. Any arrangement may be used if the number of pixels in the horizontal direction in the individual reading regions 806, 809, and 812 is the same. Naturally, this may be varied in units of rows. By shifting the additional reading regions and individual reading regions within a single frame in this manner, phase-difference detection can be performed simultaneously in any regions.

Figure 8C:
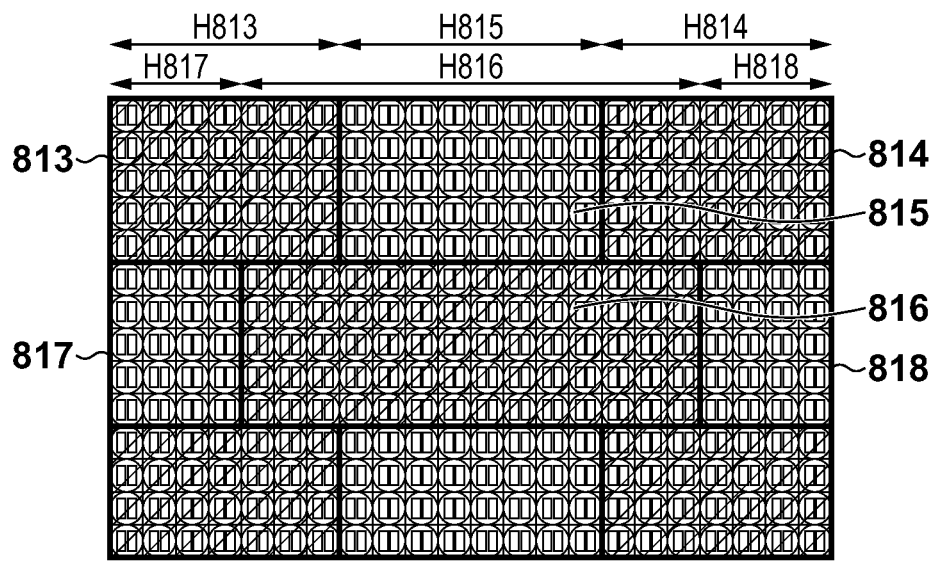

FIG. 8C shows an example of additional reading regions and individual reading regions shifted inside a frame, with multiple individual reading regions provided in the horizontal direction. In the drawing, 813, 814, and 816 are additional reading regions, and H813, H814, and H816 are the number of pixels in the horizontal direction therein. Also, 815, 817, and 818 are individual reading regions, and H815, H817, and H818 are the numbers of pixels in the horizontal direction therein. In this case, the value of H815 and the total of H817 and H818 are made the same in order to make the amount of time required for horizontal-direction reading constant. The total of H813 and H814 and the value of H816 are the same value. If the number of pixels in the horizontal direction in the individual reading region 815 is the same as the total of the number of pixels in the horizontal direction in the individual reading regions 817 and 818, then there may be any number of individual reading regions in the horizontal direction.

Figure 8D:
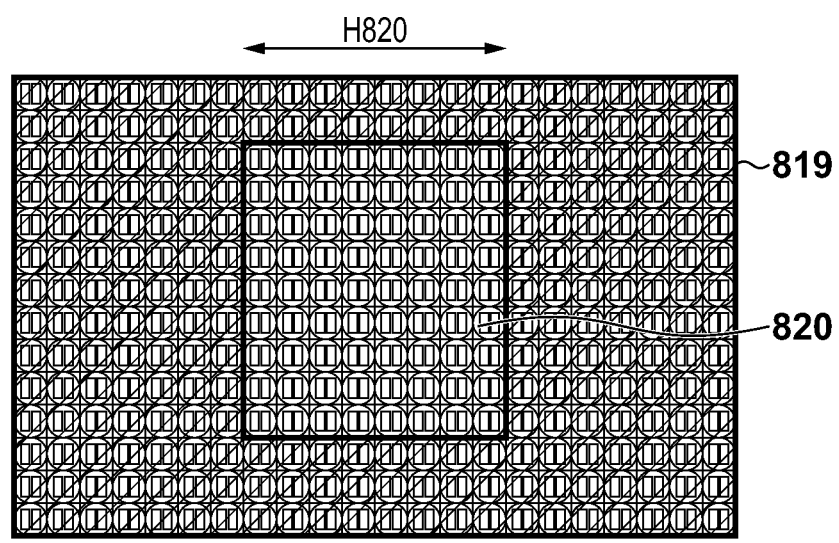

FIG. 8D shows an example in which a partial region in a pixel array is cut out. In this drawing, 819 is a region where pixels are present but the image sensor 100 does not output anything. Even when switching between operation in a non-reading region such as this and operation in the reading regions in FIG. 6, the number of pixels in the horizontal direction in the individual reading region 603 and H820, which is the number of pixels in the horizontal direction in the individual reading region 820, are the same as in other frames. Although doing so causes the amount of time required to read one frame to change when switching, the number of pixels in the regions needs not be changed when performing phase-difference detection. When changing the region for performing phase-difference detection, it is also possible to change the number of pixels in the horizontal direction in the individual reading region 820.

Selection of additional reading regions and individual reading regions as described with reference to FIGS. 6 and 8A-8D may be done on a per-column basis or selection may be done in units of delimited blocks, which are blocks including several columns. Furthermore, the signal that determines the selected regions may be input into the image sensor 100 via the serial interface (SI) 105 or input into the image sensor 100 externally, using pulses.

Next, a method for using an output signal from the image sensor, in which an additional reading region and an individual reading region are mixed in a single row, for focus detection and image signals is described.

FIGS. 9A and 9B schematically show a configuration of an image capturing apparatus according to the present embodiment. In FIGS. 10A to 10C, signals for one row output by the image sensor are schematically shown, the horizontal axis shows time, and it is shown that the signals are output sequentially from the left.

In FIG. 10A, 1001 and 1003 are signals after addition in additional reading regions and 1002 is a signal from an individual reading region.

The signal 1000 is output by the image sensor 100. A selection unit 901 gives a selection process to the output signal 1000. First, when the signal 1001 from an additional reading region is output, the selection unit 901 outputs the signal 1001 to an alignment unit 904. Next, when the signal 1002 from the individual reading region is output, the signal 1002 is output to both an addition unit 903, which serves as second adding means, and a phase-difference detection unit 902. The type of phase-difference detection computation described using FIGS. 5A and 5B is performed in the phase-difference detection unit 902. It is possible to provide the phase-difference detection unit 902 with a memory to perform phase-detection detection computation by adding together several lines of signals. The signals from the PD 203 and the PD 204 are recorded separately in the signal 1002 output to the addition unit 903, and therefore the signals from PDs in the same pixel are added together. The signal 1002 can therefore be used as an image signal.

The signal resulting from addition by the addition unit 903 is output to the alignment unit 904. Next, when the signal 1003 from an additional reading region is output, the selection unit 901 outputs the signal 1003 to the alignment unit 904. In the alignment unit 904, the signal 1001, the signal 1002, and the signal 1003 are aligned so as to achieve an optimum order as image signals. In the alignment unit 904, an adjustment is made to the delay time while the signal 1002 is undergoing an addition process in the addition unit 903, and therefore a memory may be provided or the delay time may be adjusted using a simple delay element. Besides the alignment unit 904, a memory may be provided for adjusting the delay for image data. For example, it is possible for there to be a memory between the image sensor 100 and the selection unit 901. In this way, the signals from the PDs in the same pixels in only the signal 1002 from the individual reading region are added together by the addition unit 903, and then alignment is performed, and thus the signal 1000 becomes usable as an image signal.

Alternately, the following configuration is also possible.

Instead of outputting the signals from two PDs separately in an individual reading region, two signals may be output: a signal from one PD and a signal in which the two PDs are added together. Irrespective of whether a region is an individual reading region or an additional reading region, all the image capturing signals are always added together and output by the image sensor. Because the signal from one of the two PDs is also output from only the individual reading regions, subtracting the one PD signal from the signal in which the two PDs were added together makes it possible to obtain the signal for the other PD. FIG. 9B schematically shows a configuration of an image capturing apparatus according to the present embodiment when the above driving is performed.

The signal 1000 is output by the image sensor 100. The selection unit 901 gives a selection process to the output signal 1000. First, when the signal 1001 from the additional reading region is output, the selection unit 901 outputs the signal 1001 as an image signal. Next, when the signal in which the signals from the PDs are added together in the signal 1002 from the individual reading region is output, the selection unit 901 similarly outputs this as an image signal. When the signal from the one PD, which is not the signal of the PDs added together, in the signal 1002 from the individual reading region is output, the selection unit 901 outputs this signal to a subtraction unit 905. In the subtraction unit 905, the signal of one of the PDs in the same pixel is subtracted from the signal of the PDs added together, thereby obtaining the signals from the two PDs. The two PD signals are sent to the phase-difference detection unit 902, and in the phase-difference detection unit 902, phase-difference detection computation as described using FIGS. 5A and 5B is performed. Note that it is possible to provide the phase-difference detection unit 902 with a memory to perform phase-detection detection computation by adding together multiple lines of signals. Furthermore, it is also possible to provide a memory for adjusting the signal delay in order for subtraction of the signal from the one PD in the pixel from the signal of the PDs added together.

With this configuration, the image signals are always added together inside the image sensor, making it possible to improve the SN of the image signals when added together outside the image sensor.

Furthermore, signal output from the image sensor in the case of the above configuration may be output in the order shown in FIG. 10C. In FIG. 10C, 1001 and 1003 are signals in which two PDs in the additional reading region are added together, in the output signal 1000. Additionally, a signal of two PDs added together in a non-additional reading region is output as 1004, and a signal from either one of the PDs in the non-additional reading region is output as 1005.

By being output in this manner, the image signal of the two PDs added together can be treated continuously in the order of the pixels together with the signal 1001, the signal 1004, and the signal 1003, making signal handling simple. After reading the signal 1005 of one PD in a non-addition region, it becomes easy to add, in the pixel, the signals of the two PDs in all the pixels.

FIG. 11 schematically shows a configuration of an image capturing apparatus according to the present embodiment. Unlike FIGS. 9A and 9B, the image sensor 100 shown in FIG. 11 has two output means, namely a first output 1101 and a second output 1102. A signal from the first output 1101 is a signal from an additional reading region, and a signal from the second output 1102 is a signal from an individual reading region. With this configuration, one line's worth of signal output by the image sensor 100 is as shown in FIG. 10B. The signal 1004 is the signal for the additional reading regions 1005 and 1006 output by the first output 1101, and the signal 1007 is the signal of the individual reading region output by the second output 1102. By separately outputting signals from individual reading regions and signals from additional reading regions in this manner, not only can the selection unit 901 in FIGS. 9A and 9B be omitted, but also the amount of time required for horizontal-direction reading can be made shorter.

The image capturing apparatus according to the present embodiment can also be configured as shown in FIG. 12. The image sensor 100 shown in FIG. 12 has two output means, namely a first output 1201 and a second output 1202. A signal from the first output 1201 is a signal from an additional reading region, and a signal from the second output 1202 is a signal from an individual reading region. With this image sensor, all the signals that are read in a pixel array are added together inside the image sensor. Furthermore, the signals for partial regions in the pixel array are output by the second output 1202 without being added together. In other words, the signals from the PDs in the pixels in the partial regions in the pixel array are output as added signals by the first output 1201 and output simultaneously by the second output 1202 without being added together.

For example, when reading the regions 601 to 603 shown in FIG. 6, the added signals for all the pixels are output by the first output 1201, and the signals for the region 603 are output by the second output 1202 individually, without addition. In other words, the signals for the region 603 are added together and read, and also read individually.

By separately outputting signals from individual reading regions and signals from additional reading regions in this manner, not only can the selection unit 901 and the alignment unit 904 in FIGS. 9A and 9B, as well as an addition unit outside the image sensor be omitted, but also the amount of time required for horizontal-direction reading can be made shorter.

As described above, the horizontal-direction reading time can be shortened by individually reading the PD signals from some partial regions in the pixel array and adding together and reading the PD signals from other partial regions. Furthermore, by making the number of pixels in the horizontal direction in the individual reading regions and the additional reading regions the same in one frame, image data can be obtained and phase-difference information can be obtained through simple control without complicating control of the image sensor or the image capturing apparatus.

Second Embodiment

A second embodiment is described below. The second embodiment is configured so as to perform different reading using the configuration shown in FIG. 12.

Figure 13:
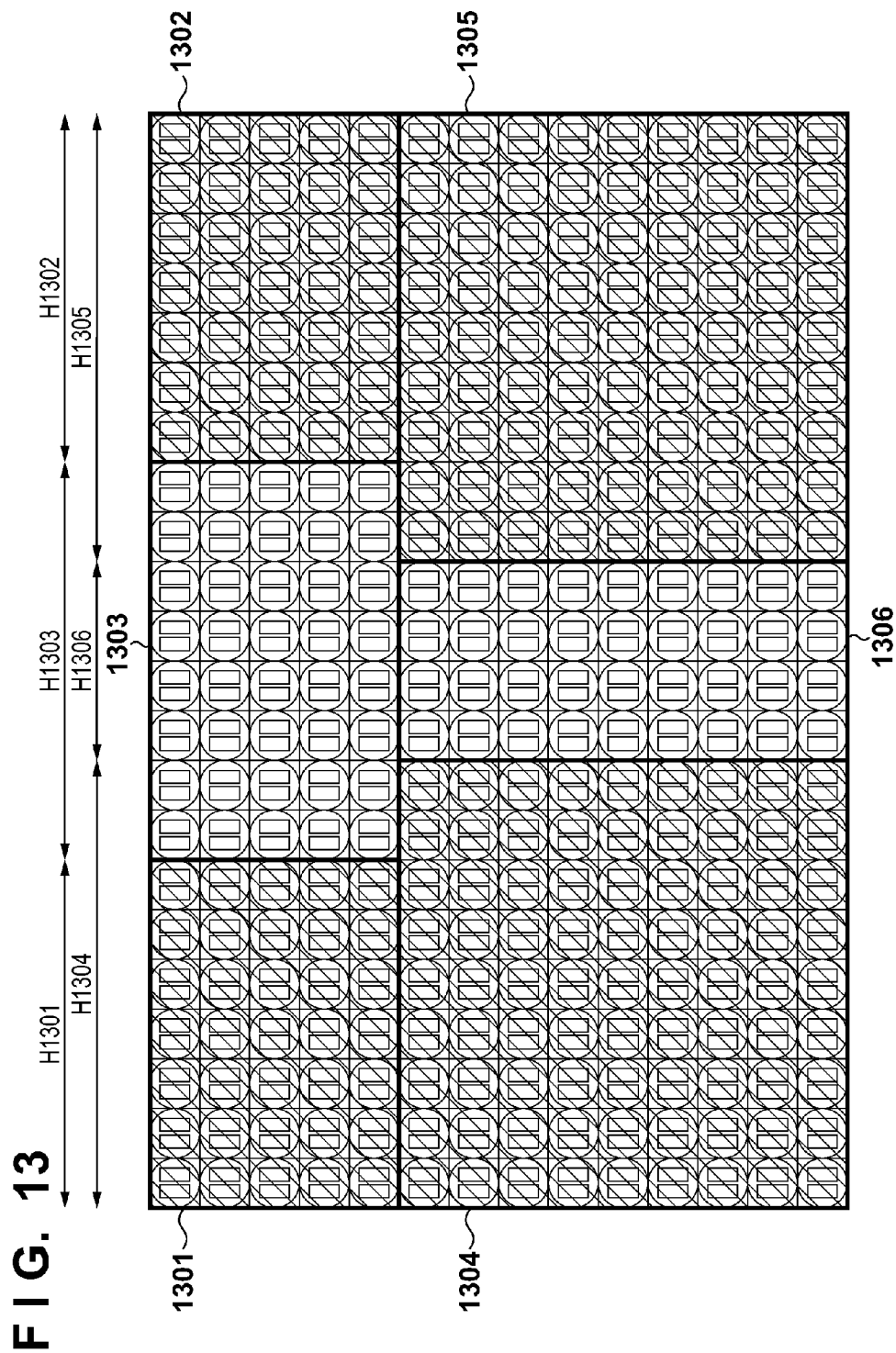
FIG. 13 is a schematic view showing additional reading regions and individual reading regions in the second embodiment.

FIG. 13 shows regions in which PD signals are read individually and added together, and regions in which they are only added together. In the drawing, 1301, 1302, 1304, and 1305 are additional reading regions in which PD signals from pixels are added together and read, and H1301, H1302, H1304, and H1305 are the number of pixels in the horizontal direction therein. Also, 1303 and 1306 are individual/additional reading regions in which the signals from the PDs in the pixels are read individually and added together, and H1303 and H1306 are the number of pixels in the horizontal direction therein. The signals from the PDs in the additional reading regions are added together in the pixel and in the read circuit 103 and output by the first output 1201. On the other hand, the signals from the individual/additional reading region are separated by, for example, the read circuit 103, added signals being output by the first output 1201 and non-added, individual signals being output by the second output 1202.

The signal for one line output by the image sensor according to the present embodiment is as shown in FIG. 14. A signal 1401 is a signal that is output by the first output 1201 and includes signals 1402 and 1403 from the additional reading regions and a signal 1404 that has been added from the individual/additional reading region. A signal 1405 is a non-added signal from the individual/additional reading region that is output by the second output 1102.

In other words, the signal 1401 is a signal in which, out of the pixels that are read from the pixel array, the PDs in all the pixels are added together, while the signal 1405 is a non-added signal from the individual/additional reading region.

The frame rate is maintained always constant by reading signals in which the PDs of all the pixels are added together in this manner. One condition for this case is that it is important that the product of the number of pixels in the horizontal direction in an individual/additional reading region and the number of times the PD of a pixel is divided in the horizontal direction does not exceed the number of pixels in the horizontal direction. For example, in the case in FIG. 13 in which the PD is divided in two in the horizontal direction, the amount of time required to read the signal 1405 will be shorter than the amount of time required to read the signal 1401, as long as twice the number of pixels in the individual/additional reading regions does not exceed the total number of pixels. To put this another way, the number of pixels H1303 needs only be less than or equal to half the total of the numbers of pixels H1301, H1303, and H1302. In other words, the amount of time required for horizontal reading is defined by the amount of time required to read the signal 1401, i.e., the amount of time required to read the total number of pixels, and the number of pixels in the horizontal direction in an individual/additional reading region does not define the amount of time required for horizontal reading.

In this image sensor and image capturing apparatus, the number of pixels in the horizontal direction in an individual/additional reading region may be changed between frames, and, as shown in FIG. 13, the numbers of pixels H1303 and H1306 may be changed within the frame.

By separating the signal from an individual/additional reading region into signals that are added together and signals that are not added together and outputting these separately, the number of pixels in the horizontal direction in an individual/additional reading region can be changed while maintaining the frame rate or horizontal reading time constant.

A configuration of an image capturing apparatus in which the image sensor of the present embodiment is applied to a digital camera is described below, with reference to FIG. 15.

Figure 15:
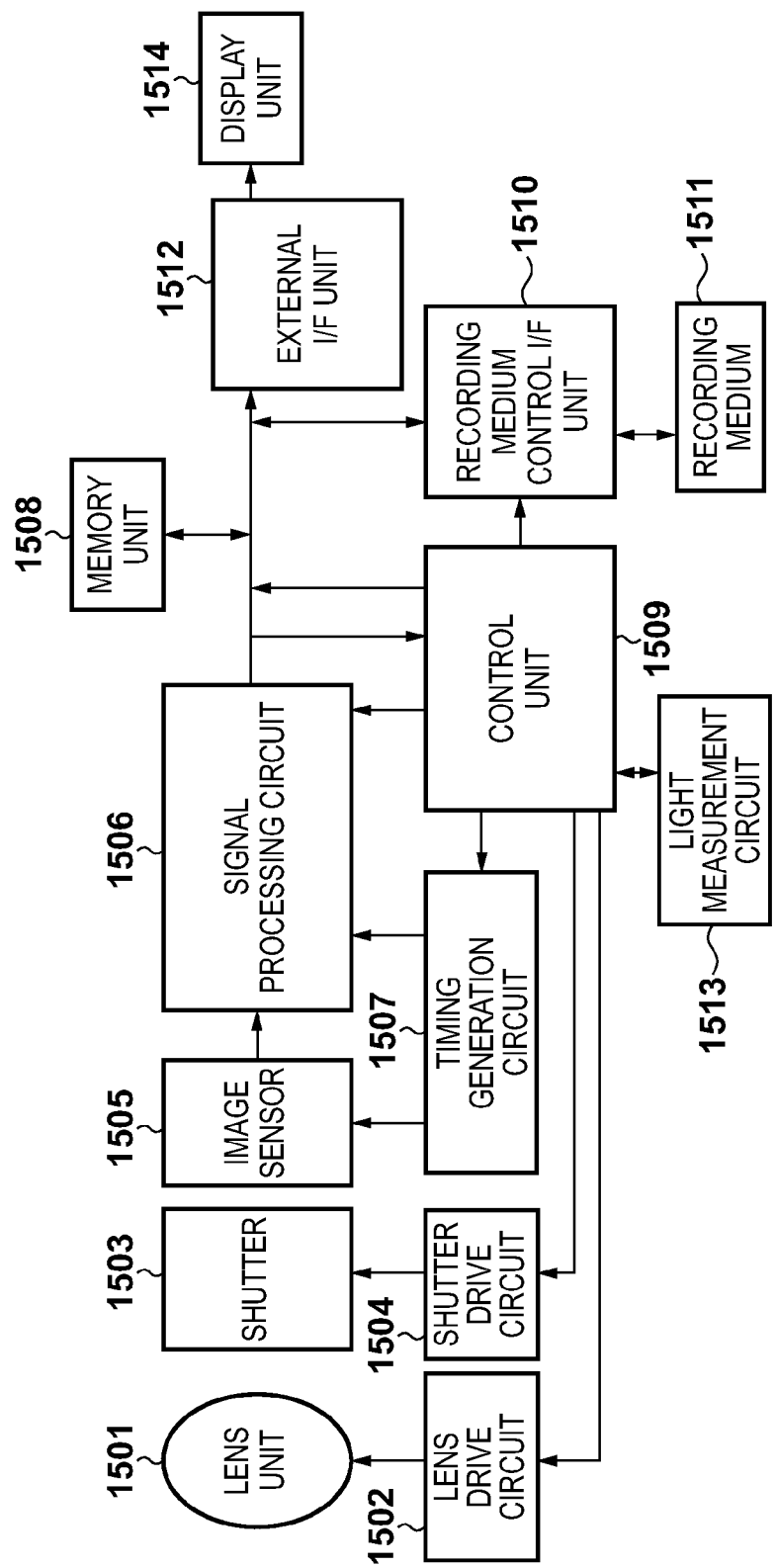
FIG. 15 is a schematic view showing a configuration of an image capturing apparatus of the present embodiment.

In FIG. 15, 1501 is a lens unit that forms an optical image of an object on an image sensor 1505 and is subjected to zoom control, focus control, aperture control, and so on by a lens drive circuit 1502. Also, 1503 is a mechanical shutter that is controlled by a shutter drive circuit 1504. Furthermore, 1505 is an image sensor for acquiring the image of the object formed by the lens unit 1501 as an image signal. Moreover, 1506 is a signal processing circuit that applies various types of correction to an image capturing signal output by the image sensor 1505, compresses data, and so on. Still further, 1507 is a timing generation circuit that outputs various timing signals to the image sensor 1505 and the signal processing circuit 1506. Still further, 1509 is a control unit that controls various computations and the camera overall, and 1508 is a memory that temporarily stores image data. Still further, 1510 is a recording medium control interface (I/F) for writing and reading data to and from a recording medium. Still further, 1511 is a removable recording medium such as a semiconductor memory or the like for reading and writing image data. Still further, 1512 is an external I/F that outputs various information and captured images to a display 1514.

A photographic operation of the digital camera of the present embodiment is described next.

When the main power supply of the digital camera is turned on, control system and image capturing system circuits are started up. When a release button that is not shown in the drawings is pressed thereafter, image capturing signals output by the image sensor 1505 are used to compute a distance measurement, and the control unit 1509 computes the distance to the object based on the distance measurement result. Thereafter, the lens unit 1501 is driven by the lens drive circuit 1502, judgment is made as to whether or not an in-focus state is obtained, and if not, the lens unit 1501 is driven and distance measurement is performed again. Distance measurement computation may be performed by a dedicated distance measurement circuit that is not shown in the drawings instead of with the image capturing signals from the image sensor 1505. A light measurement circuit 1513 measures the brightness of the object and the control unit 1509 receives the light measurement results and controls an aperture, which is not shown in the drawings, so as to achieve an optimum exposure.

Once an in-focus state is confirmed, the photographic operation is initiated. When the photographic operation ends, the image capturing signal output by the image sensor 1505 is subjected to image processing by the signal processing circuit 1506 and written to the memory 1508 by the control unit 1509. Reordering processes, addition processes, and processes for the selection thereof are performed in the signal processing circuit 1506. Data that accumulates in the memory 1508 is recorded to the recording medium 1511 by the control unit 1509 via the recording medium control I/F 1510. Furthermore, images can be manipulated by inputting them directly into a computer or the like through the external I/F 1512.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-254457, filed Nov. 21, 2011, which is hereby incorporated by reference herein in its entirety.

The invention claimed is:

1. An image sensing device comprising:
pixels having micro lenses;
a plurality of photoelectric conversion regions arranged in the pixels, wherein the pixels are arranged in a row direction and a column direction;
a combining unit configured to combine signals from the plurality of photoelectric conversion regions arranged in the same pixel; and
a setting unit configured to set an individual reading region in which combination is not performed by the combining unit,
wherein the number of pixels in a row direction in the individual reading region is constant in the row direction even when an arrangement of the individual reading region is different in the row direction.

2. The device according to claim 1, wherein the setting unit sets among the pixels an additional reading region in which combination is performed by the combining unit, further comprising:
a first outputting unit configured to output a signal from the additional reading region; and
a second outputting unit configured to output a signal from the individual reading region.

3. The device according to claim 1, further comprising a second combining unit configured to combine together signals from the photoelectric conversion regions in the individual reading region.

4. The device according to claim 1, further comprising a phase-difference detecting unit configured to perform phase-difference computation using signals from the photoelectric conversion regions of the individual reading region.

5. The device according to claim 3, further comprising an aligning unit configured to align signals combined by the second combining unit and signals combined by the combining unit into a pixel array.

6. The device according to claim 1, wherein the number of pixels in the row direction in the individual reading region is selected with a serial interface or a pulse.

7. An image sensing device comprising:
pixels having micro lenses;
a plurality of photoelectric conversion regions arranged in the pixels, wherein the pixels are arranged in a row direction and a column direction; and
a combining unit configured to combine signals from the plurality of photoelectric conversion regions arranged in the same pixel;
a first outputting unit configured to output a signal in which signals from the photoelectric conversion regions were combined by the combining unit; and
a second outputting unit configured to output signals from the photoelectric conversion regions that have not been combined by the combining unit,
wherein among the plurality of pixels, an individual/additional reading region is provided from which signals from the first outputting unit and the second outputting unit are output.

8. The device according to claim 7, wherein the product of the number of pixels in the horizontal direction in the individual/additional reading region and the number of photoelectric conversion regions arranged in the same pixel does not exceed the number of all pixels in the horizontal direction.

9. An image capturing apparatus comprising:
a photographic lens; and
the image sensing device that receives luminous flux through the photographic lens, wherein the image sensing device comprises:
pixels having micro lenses;
a plurality of photoelectric conversion regions arranged in the pixels, wherein the pixels are arranged in a row direction and a column direction;
a combining unit configured to combine signals from the plurality of photoelectric conversion regions arranged in the same pixel; and
a setting unit configured to set an individual reading region in which combination is not performed by the combining unit,
wherein the number of pixels in a row direction in the individual reading region is constant in the row direction even when an arrangement of the individual reading region is different in the row direction.

* * * * *